(12) United States Patent
Shibata

(10) Patent No.: US 7,229,348 B2
(45) Date of Patent: Jun. 12, 2007

(54) REGISTER FOR AIR CONDITIONING

(75) Inventor: Minoru Shibata, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 85 days.

(21) Appl. No.: 11/105,488

(22) Filed: Apr. 14, 2005

(65) Prior Publication Data

US 2005/0239391 A1 Oct. 27, 2005

(30) Foreign Application Priority Data

Apr. 22, 2004 (JP) ............................. 2004-126396

(51) Int. Cl.
*B60H 1/34* (2006.01)
(52) U.S. Cl. ................................... 454/155
(58) Field of Classification Search ............... 454/155, 454/152
See application file for complete search history.

(56) References Cited

U.S. PATENT DOCUMENTS

2002/0178744 A1* 12/2002 Tanabe et al. ............... 62/407

2003/0050001 A1* 3/2003 Kamio ....................... 454/155

FOREIGN PATENT DOCUMENTS

JP A-11-180140 7/1999

* cited by examiner

*Primary Examiner*—Josiah Cocks
*Assistant Examiner*—Helena Kosanovic
(74) *Attorney, Agent, or Firm*—Posz Law Group, PLC

(57) ABSTRACT

An air-conditioning register is buried in a decorative panel having a decorative surface, and includes a cylinder-shaped retainer having a ventilation passage, a fin assembly disposed swingably and adjacent to the outlet opening in the retainer, a connecting member for connecting the fin assembly, and an operating member for driving the connecting member. The air-conditioning register operates interchangeably between a blowing direction adjusting mode, in which the fin assembly adjusts a blowing direction of air-conditioning air, and a shut-off mode, in which the fin assembly shuts off the outlet opening. The ventilation passage extends in a lengthwise direction which intersects with the decorative surface at an acute angle. The fin assembly includes main fin members, and a sub fin member. In the blowing direction adjusting mode, the main fin members swing, but the sub fin member is held substantially parallel to the lengthwise direction of the ventilation passage.

6 Claims, 12 Drawing Sheets

REGISTER FOR AIR CONDITIONING

BACKGROUND OF THE INVENTION

1. Field of the Invention

The present invention relates to a register for supplying air-conditioning air into rooms, such as vehicle passenger rooms.

2. Description of the Related Art

For example, Japanese Unexamined Patent Publication (KOKAI) No. 11-180,140 discloses an air-conditioning register which is operable interchangeably from the blowing direction adjusting mode to the shut-off mode or vice versa. In the blowing direction adjusting mode, the shut-off damper opens the ventilation passage. Note that the horizontal fin assembly or the vertical fin assembly can adjust the blowing direction of air-conditioning air in the blowing direction adjusting mode. On the other hand, in the shut-off mode, the shut-off damper shuts off the ventilation passage. Note that the horizontal fin assembly shuts off the outlet opening as well in the shut-off mode. When the horizontal fin assembly shuts off the outlet opening, an operator can recognize visually that no air-conditioning air is supplied from the outlet opening.

Note that, in the conventional air-conditioning register set forth in Japanese Unexamined Patent Publication (KOKAI) No. 11-180,140, all of the six horizontal fin members making the horizontal fin assembly can swing when adjusting the blowing direction of air-conditioning air downward in the blowing direction adjusting mode. That is, when an operator tries to adjust the blowing direction of air-conditioning air downward, the lowermost horizontal fin member is also directed downward in the same manner as the other five horizontal fin members.

Meanwhile, the outlet opening of the air-conditioning register set forth in Japanese Unexamined Patent Publication (KOKAI) No. 11-180,140 inclines so as to bulge into a room from small to large from upward to downward. Accordingly, when the lowermost horizontal fin member is directed downward, the lowermost horizontal fin member and the decorative panel with the outlet opening opened are disposed successively at an angle relatively approximate to the ventilation or blowing direction of air-conditioning air. Consequently, the airflow of air-conditioning air flowing along the lowermost horizontal fin member has flowed as it is along the decorative panel. Therefore, wake flows have occurred. Thus, when adjusting the blowing direction of air-conditioning air downward, the air-conditioning register set forth in the Japanese patent publication exhibits a low directivity of air-conditioning air.

SUMMARY OF THE INVENTION

The present invention has been developed and completed in view of the aforementioned problem. It is therefore an object of the present invention to provide a register for air conditioning which exhibits a high directivity of air-conditioning air when adjusting the blowing direction of air-conditioning air.

A register for air conditioning according to a first preferable arrangement of the present invention can solve the aforementioned problem, is buried in a decorative panel, and comprises:

a cylinder-shaped retainer having a ventilation passage through which air-conditioning air flows, and an outlet opening which is communicated with the ventilation passage, and from which the air-conditioning air flows out into a room;

a fin assembly disposed swingably and adjacent to the outlet opening in the retainer;

a connecting member for connecting the fin assembly; and an operating member for driving the connecting member, whereby operating the register interchangeably between a blowing direction adjusting mode, in which the fin assembly adjusts a blowing direction of the air-conditioning air, and a shut-off mode, in which the fin assembly shuts off the outlet opening;

the ventilation passage of the retainer extending in a lengthwise direction which intersects with the decorative surface of the decorative panel at an acute angle;

the fin assembly comprising a plurality of main fin members disposed in a manner neighboring one after another, and a sub fin member disposed before the first one of the main fin members or after the last one of the main fin members;

the main fin members swinging and the sub fin member being held substantially parallel to the lengthwise direction of the ventilation passage in the blowing direction adjusting mode.

The fin assembly comprises the main fin members, and the sub fin member. The sub fin member is disposed before the first one of the main fin members or after the last one of the main fin members. In other words, the sub fin member is disposed adjacent to one of the opposite inner surfaces of the retainer.

In the blowing direction adjusting mode, the main fin members swing. On the contrarily, the sub fin member is independent of the swinging main fin members, and is held substantially parallel to the lengthwise direction of the ventilation passage. Accordingly, the sub fin member and the decorative surface of the decorative panel are less likely to be disposed at relatively close angles to each other. Consequently, wake flows are less likely to occur. Thus, the present air-conditioning register exhibits a high directivity of air-conditioning air because it inhibits wake flows from occurring.

The present air-conditioning register according to the first preferable arrangement can further preferably be arranged so that: when switching the blowing direction adjusting mode to the shut-off mode; the main fin members swing beyond their swingable range in the blowing direction adjusting mode; and the sub fin member swings at a swinging speed faster than that of the main fin members.

Switching the blowing direction adjusting mode to the shut-off mode is carried out by swinging the main fin members beyond their swingable range in the blowing direction adjusting mode. Accordingly, when starting switching the blowing direction adjusting mode to the shut-off mode, the main fin members have swung already with respect to the lengthwise direction of the ventilation passage by the swingable angular range in the blowing direction adjusting mode.

On the other hand, as described above, the sub fin member is held substantially parallel to the lengthwise direction of the ventilation passage in the blowing direction adjusting mode. Accordingly, when starting switching the blowing direction adjusting mode to the shut-off mode, the sub fin member has been kept being held parallel to the lengthwise direction of the ventilation passage.

Thus, there arises a swinging angle difference between the main fin members and the sub fin member to such an extent resulting from the swingable angular range in the blowing direction adjusting mode. In order to correct the swinging angle difference, the swinging speed of the sub fin member is set faster than the swinging speed of the main fin members in the present air-conditioning register according to the second preferable arrangement. The second preferable arrangement offers a better appearance because it synchronizes the swinging movements of the main fin members and sub fin member decoratively in switching the blowing direction adjusting mode to the shut-off mode.

The second preferable arrangement can furthermore preferably be arranged so that: when switching the blowing direction adjusting mode to the shut-off mode; the main fin members and the sub fin member stop swinging substantially simultaneously.

The third preferable arrangement can correct the swinging angle difference between the main fin members and the sub fin member substantially completely when finishing switching the blowing direction adjusting mode to the shut-off mode. Therefore, all of the fin members (i.e., the main fin members and sub fin members) making the fin assembly complete shutting off the outlet opening substantially simultaneously. As a result, the third preferable arrangement offers a much better appearance.

The second preferable arrangement can furthermore preferably be arranged so that: the connecting member comprises main connectors in the same quantity as that of the main fin members, and a sub connector; the main fin members comprise a main-side center making a swing center in swinging, and a main-side connector connected with one of the main connectors, respectively; the sub fin member comprises a sub-side center making a swing center in swinging, and a sub-side connector connected with the sub connector; and a first distance between the sub-side center and the sub-side connector is shorter than a second distance between the main-side center and the main-side connector.

For example, the first distance between the sub-side center and the sub-side connector is defined as a swingable radius of the sub fin member. Likewise, the second distance between the main-side center and the main-side connector is defined as a swingable radius of the main fin members. Note that the sub fin member and main fin members are disposed successively by way of the connecting member.

Let us make an assumption herein that all of the displacing magnitude of the connecting member, the swinging magnitude of the main fin members and the swinging magnitude of the sub fin member are L. In this instance, let the swinging radius of the main fin members be $R_1$ and the swinging radius of the sub fin member be $R_2$, the swinging angle $\theta_1$ (in degrees) of the main fin members can be expressed as $360 \, L/2 \, \pi R_1$, and the swinging angle $\theta_2$ (in degrees) of the sub fin members can be expressed as $360 \, L/2 \, \pi R_2$. In the fourth preferable arrangement, $R_2$ is set to be smaller than $R_1$ (i.e., $R_2 < R_1$). Accordingly, $\theta_2$ is greater than $\theta_1$ (i.e., $\theta_2 > \theta_1$). Consequently, the sub fin member swings at a faster speed than that of the main fin members.

Thus, the fourth preferable arrangement can make the swinging speed of the sub fin member faster than that of the main fin members by such relatively simple means as setting the swinging radius $R_2$ of the sub fin member smaller than the swinging radius $R_1$ of the main fin members.

The fourth preferable arrangement can preferably be moreover arranged so that: one of the sub connector and the sub-side connector comprises a guide groove; the other one of the sub connector and the sub-side connector comprises a guided boss disposed slidably in the guide groove relatively to the one of the sub connector and the sub-side connector; the connecting member moves within a movable range of the guided boss in the guide groove in the blowing direction adjusting mode, thereby inhibiting a driving force from transmitting from the connecting member to the sub fin member; and the connecting member moves beyond the movable range of the guided boss in the guide groove when switching the blowing direction adjusting mode to the shut-off mode, thereby enabling a driving force to transmit from the connecting member to the sub fin member.

In the blowing direction adjusting mode, the guided boss only slides in the guide groove relatively to the one of the sub connector and the sub-side connector. Accordingly, no driving force transmits between the connecting member and the sub fin member. Consequently, the sub fin member does not swing.

On the other hand, when switching the blowing direction adjusting mode to the shut-off mode, the guided boss contacts with an opposite end of the guide groove which demarcates the movable range. Accordingly, a driving force transmits from the connecting member to the sub fin member via the contact between the guided boss and the guide groove. Consequently, the sub fin member swings.

Thus, the fifth preferable arrangement can control the swing of the sub fin member by sliding the guided boss in the guide groove and contacting the guided boss with the opposite end of the guide groove.

The first preferable arrangement can preferably be further arranged so that: the ventilation passage extends in a substantially horizontal direction; the decorative panel comprises an instrument panel having a decorative surface which inclines so as to bulge into the room from small to large from upward to downward; the fin assembly comprises a horizontal fin assembly; and the sub fin member is disposed at the lowermost in the horizontal fin assembly.

Recently, in vehicle interiors, it is in fashion to slant instrument panels from small to large in the up/down direction. When disposing an air-conditioning register in such a slanted instrument panel and adjusting the blowing direction of air-conditioning air downward with the air-conditioning register, the slanting direction of a decorative surface of the instrument panel might coincide virtually with the airflow direction of the air-conditioning air as described above. As a result, wake flows might occur.

In view of the circumstances, in the sixth preferable arrangement, the sub fin member is disposed at the lowermost in the horizontal fin assembly. Note that the sub fin member is disposed in the lengthwise direction of the ventilation passage, that is, in a substantially horizontal direction, in the blowing direction adjusting mode. Accordingly, the sub fin member directs the airflow in the lengthwise direction of the ventilation passage, that is, in a substantially horizontal direction so that the thus directed airflow blows out in a substantially horizontal direction independently of the swinging angle of the main fin members. Consequently, wake flows are less likely to occur. Thus, the sixth preferable arrangement is appropriate for embodying an air-conditioning register to be buried in instrument panels which are slanted from small to large in the up/down direction.

As described above, the present invention enables manufactures to provide air-conditioning registers which exhibit a high air-conditioning air directivity in adjusting the blowing direction.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims. Hereinafter, the present invention will be described with reference to forms of embodying the present air-conditioning register which is buried in an instrument panel in a vehicle passenger room.

EXAMPLE

Figure 1:
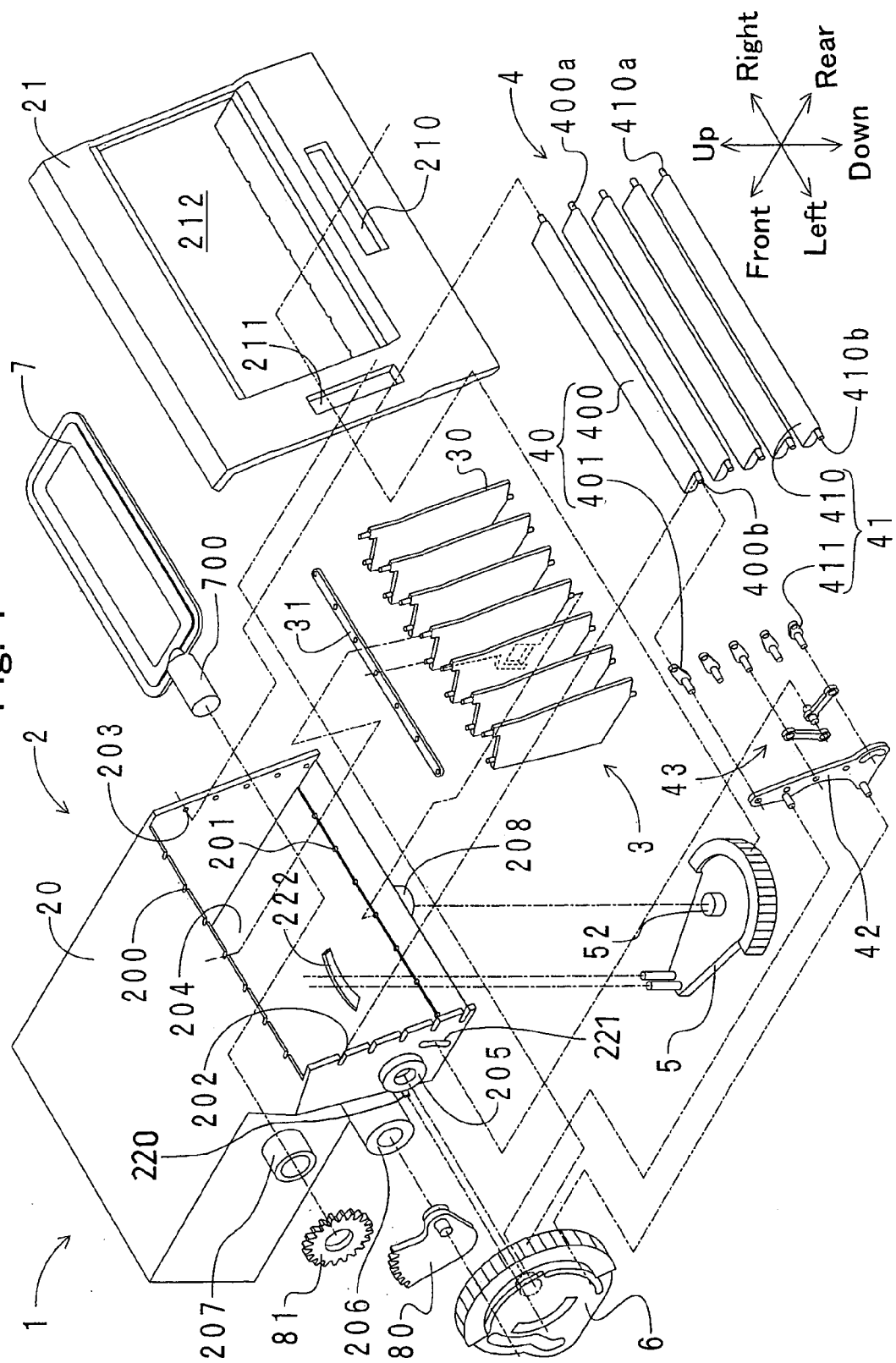
FIG. 1 is an exploded perspective view of an air-conditioning register according to an example of the present invention.
Figure 2:
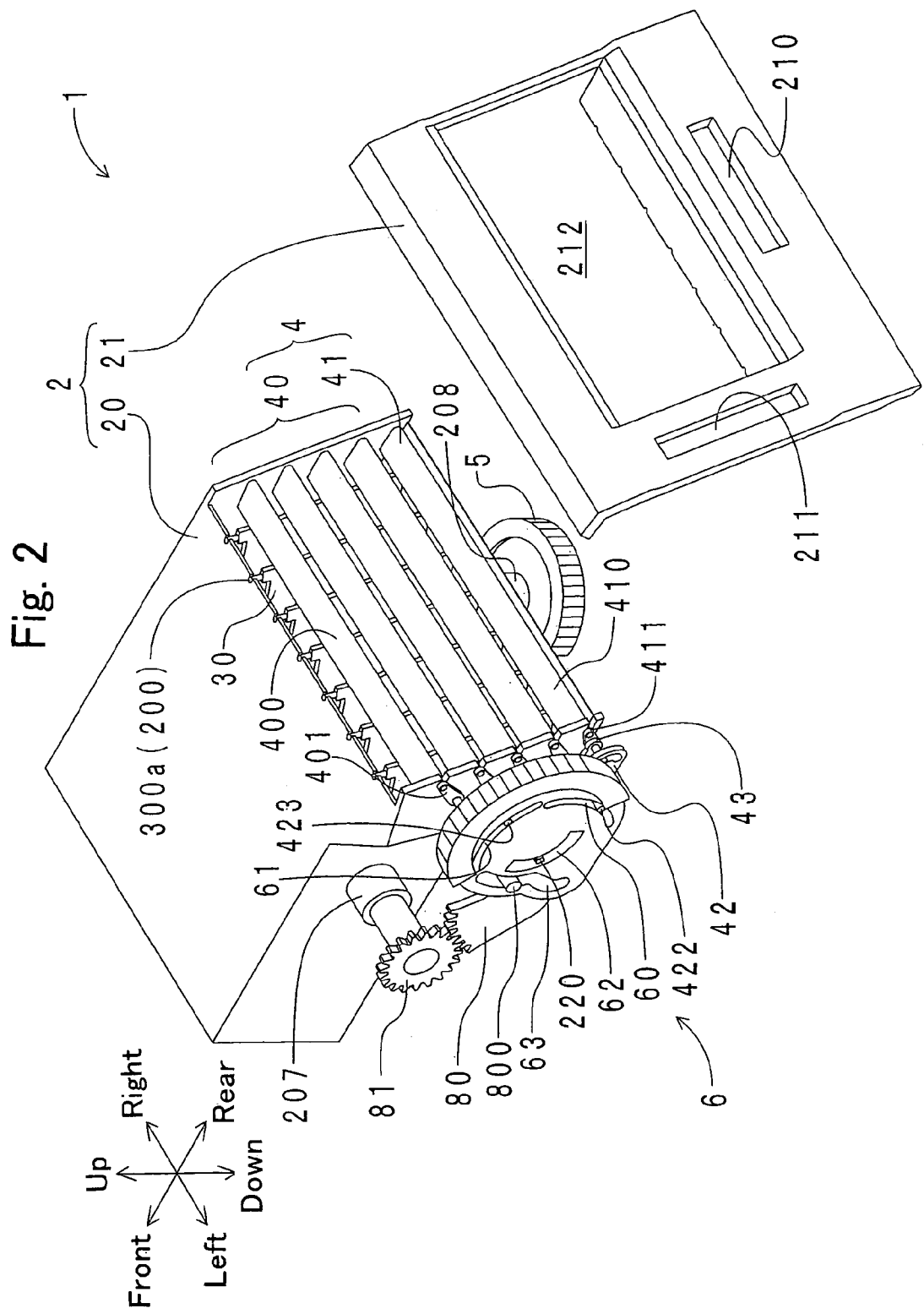
FIG. 2 is an assembled perspective view of the air-conditioning register.
Figure 3:
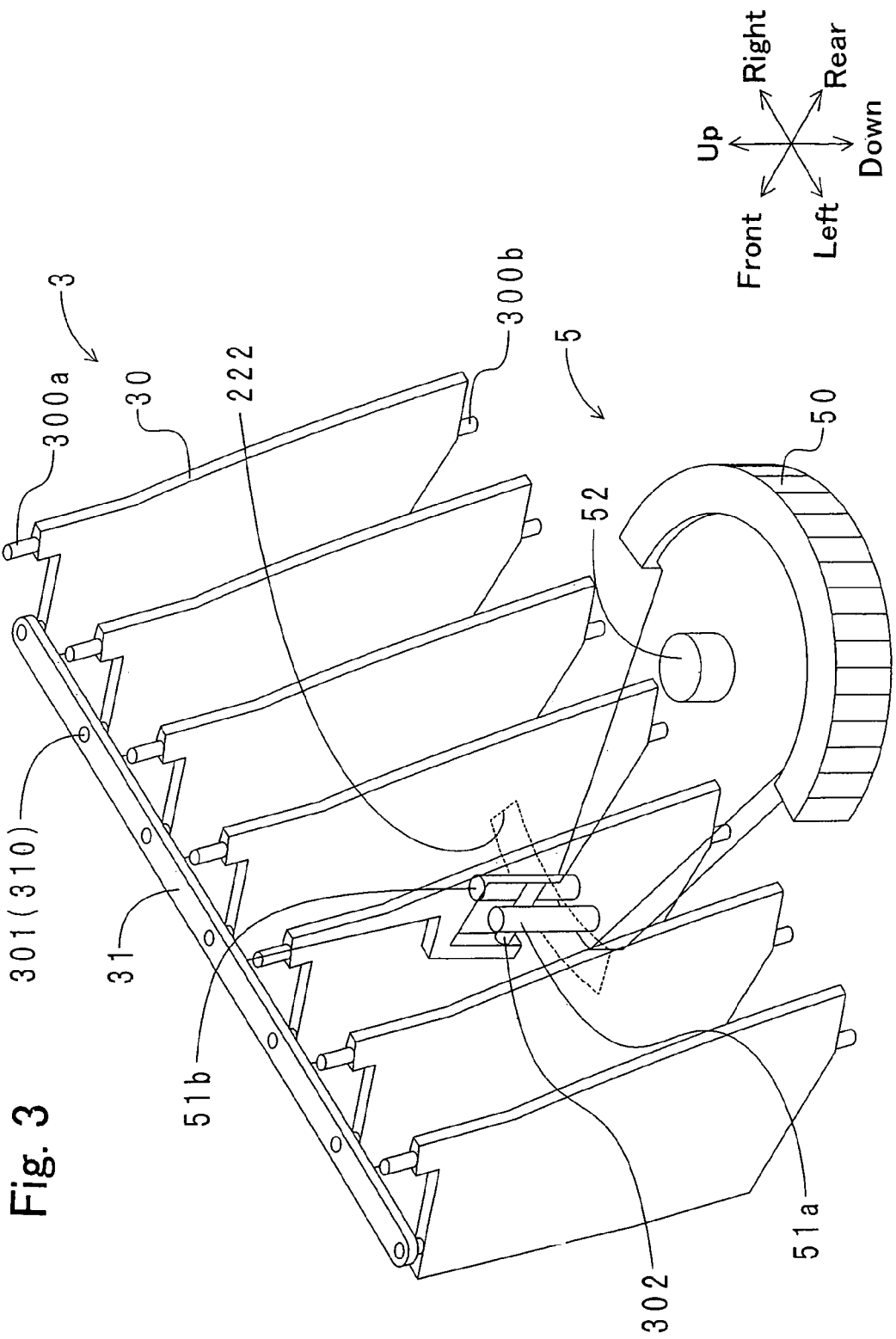
FIG. 3 is a perspective view for illustrating a link mechanism for a vertical fin assembly of the air-conditioning register.
Figure 4:
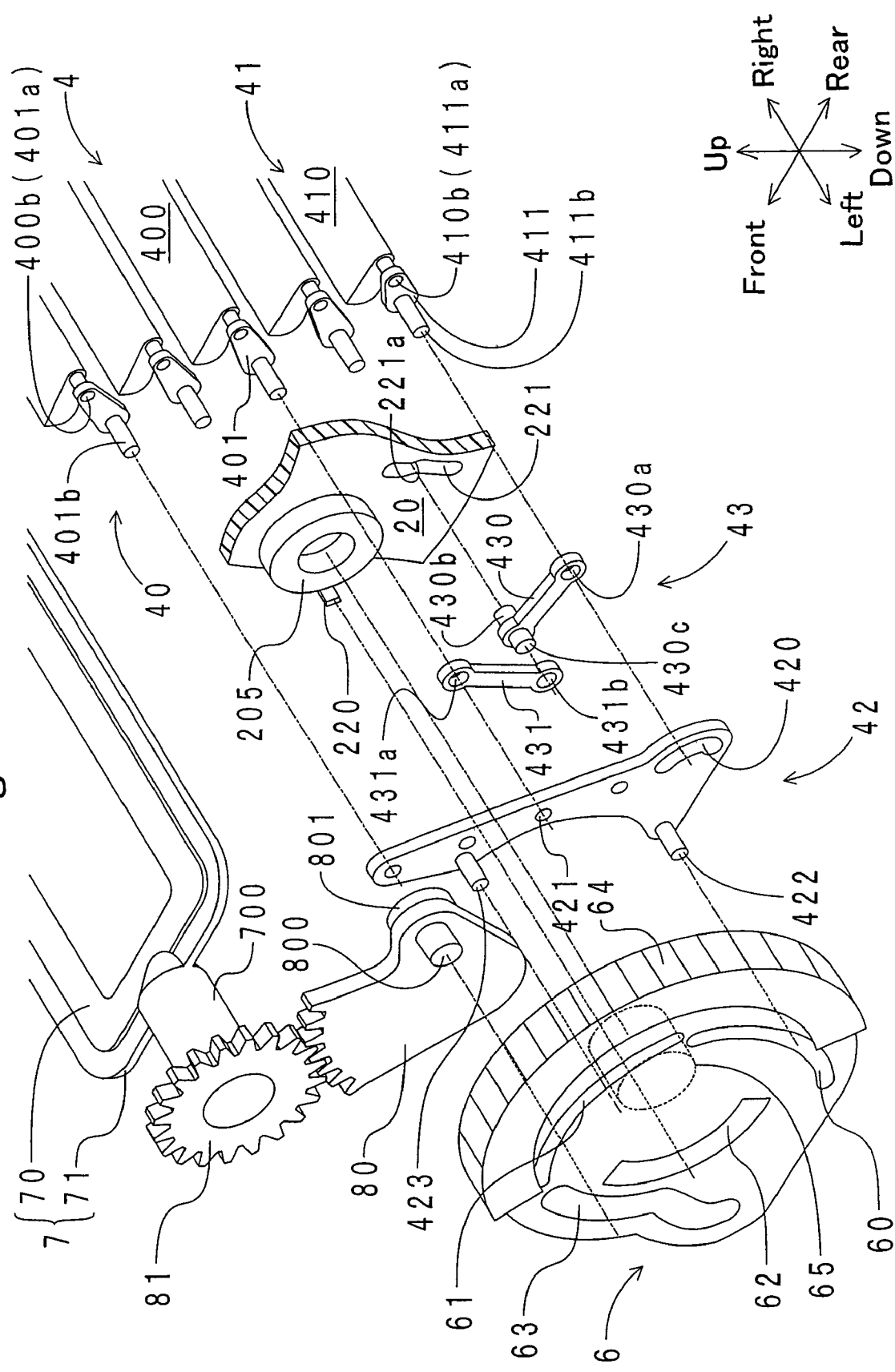
FIG. 4 is a perspective view for illustrating a link mechanism for a horizontal fin assembly of the air-conditioning register.

The arrangement of an air-conditioning register according to an example of the present invention will be hereinafter described in detail. FIG. 1 illustrates an exploded perspective view of an air-conditioning register according to an example of the present invention. FIG. 2 illustrates an assembled perspective view of the air-conditioning register. FIG. 3 illustrates a link mechanism for a vertical fin assembly of the air-conditioning register. FIG. 4 illustrates a link mechanism for a horizontal fin assembly of the air-conditioning register. In the drawings, the orientations are defined based on the forward/rear and right/left directions of a vehicle. Note that, in FIG. 3, vertical fin members are illustrated in a see-through manner for descriptive convenience.

As illustrated in the drawings, an air-conditioning register 1 comprises a retainer 2, a vertical fin assembly 3, a horizontal fin assembly 4, a horizontal-fin-assembly connecting rod 42, a vertical-fin-assembly operation dial 5, a horizontal-fin-assembly operation dial 6, and a shut-off damper 7. Note that the present connecting member includes the horizontal-fin-assembly connecting rod 42; and the present operating member includes the horizontal-fin-assembly operation dial 6.

The retainer 2 comprises a retainer body 20, and a bezel 21. The retainer body 20 is buried inside a slanted instrument panel (not shown) which bulges from small to large in the direction of from the front/top to the rear/bottom. The retainer body 20 is made of resin, and is formed as a rectangular cylinder shape which extends in the front/rear direction. Inside the retainer body 20, there is demarcated a ventilation passage 204. At the front end of the retainer body 20, there is connected an air-conditioning duct (not shown). In the top wall of the retainer body 20, there are formed vertical-fin swinging grooves 200. The vertical-fin swinging grooves 200 are aligned in the horizontal direction (or in the right/left direction), and are disposed in a quantity of seven in total. In the bottom wall of the retainer body 20, there are bored vertical-fin swinging holes 201. The vertical-fin swinging holes 201 are disposed to face the vertical-fin swinging grooves 200 in a quantity of seven in total. Moreover, a fourth receptacle 208 protrudes from the bottom surface of the bottom wall of the retainer body 20. In addition, in the bottom wall of the retainer body 20, there is opened an arc-shaped opening 222. The arc-shaped opening 222 is formed as a partial arc shape about the fourth receptacle 208. In the rear edge of the left wall of the retainer body 20, there are formed horizontal-fin swinging grooves 202. The horizontal-fin swinging grooves 202 are aligned in the up/down direction, and are disposed in a quantity of five in total. In the rear edge of the right wall of the retainer body 20, there are bored horizontal-fin swinging holes 203. The horizontal-fin swinging holes 203 are aligned in the up/down direction, and are disposed in a quantity of five in total. A first receptacle 205, a second receptacle 206, and a third receptacle 207 protrude from the left wall of the retainer body 20. At the rear of the first receptacle 205 in the left wall of the retainer body 20, there is formed an arm/boss guide groove 221 (best shown in FIG. 4) which extends in the up/down direction. On the other hand, a square rod-shaped stopper 220 (best shown in FIG. 4) protrudes in front of the first receptacle 205 in the left wall of the retainer body 20.

As illustrated in FIG. 1, the bezel 21 is made of resin, and is formed as a rectangular plate shape. The bezel 21 is fastened to the rear end of the retainer body 20 with screws (not shown). The bezel 21 is disposed substantially flush with the decorative surface of the instrument panel. In the bezel 21, there is opened a rectangular outlet opening 212 which communicates with the ventilation passage 204. Air-conditioning air is supplied from the outlet opening 212 to a vehicle passenger room. Under the outlet opening 212, there is formed a vertical-fin-assembly operation slit 210 which extends in the right/left direction. Moreover, on the left side of the outlet opening 212, there is formed a horizontal-fin-assembly operation slit 211 which extends in the up/down direction.

The vertical fin assembly 3 comprises seven vertical fin members 30 in total. The vertical fin assembly 3 is disposed inside the retainer body 20. The vertical fin members 30 are made of resin, and are formed as a rectangular plate shape which extends in the up/down direction, respectively. As illustrated in FIG. 3, a vertical-fin swing shaft 300a protrudes from the top end of the vertical fin members 30, respectively. The vertical-fin swing shafts 300a are fitted into the vertical-fin swinging grooves 200 formed in the top wall of the retainer body 20, respectively. Another vertical-fin swing shaft 300b protrudes from the bottom end of the vertical fin members 30, respectively. The vertical-fin swing shafts 300b are fitted into the vertical-fin swinging holes 201 formed in the bottom wall of the retainer body 20, respectively. Thus, the vertical fin members 30 can swing about the vertical-fin swing shafts 300a, 300b. Moreover, a vertical-fin connector shaft 301 (best shown in FIG. 3) protrudes upward from the front end in the top periphery of the vertical fin members 30, respectively. At the bottom in the front periphery of one of the seven vertical fin members 30, specifically, at the bottom in the front periphery of the vertical fin member 30, which is disposed at the middle in the right/left direction, there is disposed a driving-force transmitter rod 302.

On the vertical fin assembly 3, there is disposed a vertical-fin connecting rod 31 as illustrated in FIG. 3. The vertical-fin connecting rod 31 is made of resin, and is formed as a strip-shaped plate which extends in the right/left direction. In the vertical-fin connecting rod 31, there are bored vertical-fin connector holes 310. The vertical-fin connector holes 310 are aligned in the longitudinal direction of the vertical-fin connecting rod 31, and are disposed in a quantity of seven in total. The vertical-fin connector shafts 301 are fitted swingably into the vertical-fin connector holes 310.

The vertical-fin-assembly operation dial 5 is made of resin, and is formed as a trapezoid at the front and a semi-circle at the rear as illustrated in FIGS. 1 and 3. At the rear of the vertical-fin-assembly operation dial 5, there is disposed an input element 50 which is formed as a partial arc shape. The input element 50 is exposed to the vehicle passenger room through the vertical-fin-assembly operation slit 210. Round bar-shaped dial pins 51a, 51b protrude upward from the front end of the vertical-fin-assembly operation dial 5. The dial pins 51a, 51b are separated at a predetermined interval in the right/left direction, and are disposed parallel to each other. The dial pins 51a, 51b are fitted into the retainer body 20 through the arc-shaped opening 222. The dial pins 51a, 51b hold the driving-force transmitter rod 302 in the right/left direction. A dial swing boss 52 protrudes upward from the center of the arc-shaped input element 50. The dial swing boss 52 is fitted swingably into the fourth receptacle 208 as shown in FIG. 1.

As illustrated in FIG. 1, the horizontal fin assembly 4 comprises four main fin members 40 in total, and a sub fin member 41. The horizontal fin assembly 4 is disposed adjacent to the outlet opening 212 inside the retainer body 20. The four main fin members 40 are disposed to align in the up/down direction. The main fin members 40 comprise a main fin body 400, and a main-fin fastener tab 401, respectively. The main fin bodies 400 are made of resin, and are formed as a strip shape which extends in the right/left direction, respectively. A main-fin swing shaft 400a protrudes from the right periphery of the main fin bodies 400, respectively. The main-fin swing shafts 400a are fitted swingably into the horizontal-fin swinging holes 203, respectively. On the other hand, another main-fin swing shaft 400b protrudes from the left periphery of the main fin bodies 400, respectively. Note that the present main-side center includes the main-fin swing shafts 400b. The main-fin swing shafts 400b are fitted swingably into the horizontal-fin swinging grooves 202. Note that the leading end of the main-fin swing shafts 400b penetrates through the left wall of the retainer body 20.

The main-fin fastener tabs 401 are made of resin, and are formed as a short strip shape. At one of the longitudinal opposite ends of the main-fin fastener tabs 401, there is bored a main-fin fastener hole 401a as illustrated in FIG. 4. The leading end of the main-fin swing shafts 400b is fitted into the main-fin fastener hole 401a, and is fastened thereto. On the other hand, a main-fin connector shaft 401b protrudes leftward from the other one of the longitudinal opposite ends of the main-fin fastener tabs 401. Note that the main-side connector includes the main-fin connector shafts 401b.

The sub fin member 41 is disposed under the four main fin members 40. That is, the sub fin member 41 is disposed at the lowermost in the horizontal fin assembly 4. The sub fin member 41 comprises a sub fin body 410, and a sub-fin fastener tab 411. The sub fin body 410 is made of resin, and is formed as a strip shape which extends in the right/left direction. As illustrated in FIG. 1, a sub-fin swing shaft 410a protrudes from the right periphery of the sub fin body 410. The sub-fin swing shaft 410a is fitted swingably into the horizontal-fin swinging hole 203. On the other hand, another sub-fin swing shaft 410b protrudes from the left periphery of the sub fin body 410. Note that the present sub-side center includes the sub-fin swing shaft 410b. The sub-fin swing shaft 410b is fitted swingably into the horizontal-fin swinging groove 202 as shown in FIG. 1. Note that the leading end of the sub-fin swing shaft 410b penetrates through the left wall of the retainer body 20.

As illustrated in FIG. 4, the sub-fin fastener tab 411 is made of resin, and is formed as a short strip shape. At one of the longitudinal opposite ends of the sub-fin fastener tab 411, there is bored a sub-fin fastener hole 411a. The leading end of the sub-fin swing shaft 410b is fitted into the sub-fin fastener hole 411a, and is fastened thereto. On the other hand, a guided boss 411b protrudes leftward from the other one of the longitudinal opposite ends of the sub-fin fastener tab 411.

As illustrated in FIGS. 1 and 4, on the left side of the horizontal fin assembly 4, there is disposed a connecting arm 43. The connecting arm 43 comprises a sub fin-side rod 430, and a main fin-side rod 431 as shown in FIG. 4. The sub fin-side rod 430 is made of resin, and is formed as a rectangular rod shape. At the rear end of the sub fin-side rod 430, there is bored a sub-fin through hole 430a. The guided boss 411b is fitted swingably into the sub-fin through hole 430a. A first arm boss 430b protrudes rightward from the front end of the sub fin-side rod 430. The first arm boss 430b contacts slidably with the arm/boss guide groove 221 formed in the left wall of the retainer body 20. Moreover, a second arm boss 430c protrudes leftward from the front end in the opposite surface with respect to the first arm boss 430b.

The main fin-side rod 431 is made of resin, and is formed as a rectangular rod shape. At the top end of the main fin-side rod 431, there is bored a main-fin through hole 431a. The main-fin connector shaft 401b of one of the five main fin members 40, specifically, the main-fin connector shaft 401b of the main fin members 40 disposed at the middle is fitted swingably into the main-fin through hole 431a. On the other hand, at the bottom end of the main fin-side rod 431, there is bored an arm connector hole 431b. The second arm boss 430c is fitted swingably into the arm connector hole 431b.

As illustrated in FIGS. 1 and 4, the horizontal-fin-assembly connecting rod 42 is disposed on the left side of the connecting arm 43. The horizontal-fin-assembly connecting rod 42 is made of resin, and is formed as a strip-shaped plate which extends in the up/down direction. In the horizontal-fin-assembly connecting rod 42, there are formed four main-fin swinging holes 421 to face the four main fin members 40. The present main connectors include the main-fin swinging holes 421. The main-fin connector shafts 401b are fitted swingably into the main-fin swinging holes 421, respectively. Note that the main-fin connector shaft 401b of the third main fin member 40 from the top penetrates through the main-fin through hole 431a, and is thereafter fitted into the third main-fin swinging hole 421 from the top. Under the lowermost main-fin swinging hole 421, there is formed a deformed arc-shaped guide groove 420. The guided boss 411b of the sub-fin fastener tab 411 contacts slidably with the guide groove 420. That is, the guided boss 411b penetrates through the sub-fin through hole 430a, and thereafter contacts slidably with in the guide groove 420. A connecting-rod first pin 422 protrudes leftward from the bottom end of the horizontal-fin-assembly connecting rod 42. Moreover, a connecting-rod second pin 423 protrudes similarly leftward from the top of the horizontal-fin-assembly connecting rod 42.

As illustrated in FIGS. 1, 2 and 4, the horizontal-fin-assembly operation dial 6 is disposed on the left side of the horizontal-fin-assembly connecting rod 42. The horizontal-fin-assembly operation dial 6 is made of resin, and is formed as a disk shape. As shown in FIG. 4, a dial swing boss 65 (designated with hatched lines) protrudes from a substantially middle in the right surface of the horizontal-fin-assembly operation dial 6. The dial swing boss 65 is fitted swingably into the first receptacle 205. On the rear periphery of the horizontal-fin-assembly operation dial 6, there is formed an input element 64. The input element 64 is exposed to the vehicle passenger room through the horizontal-fin-assembly operation slit 211. In the horizontal-fin-assembly operation dial 6, there are formed a first-pin groove 60, a second-pin groove 61, a stopper groove 62, and a sector-gear groove 63. As shown in FIG. 2, the connecting-rod first pin 422 contacts slidably with the first-pin groove 60. The connecting-rod second pin 423 contacts slidably with the second-pin groove 61. The stopper 220 contacts slidably with the stopper groove 62.

As illustrated in FIGS. 1, 2 and 4, at the rear of the horizontal-fin-assembly operation dial 6, there is disposed a sector gear 80. The sector gear 80 is made of resin, and is formed as a deformed sector-shaped disk. As shown in FIG. 4, a gear swing boss 801 protrudes from the right surface of the sector gear 80. As shown in FIG. 1, the gear swinging boss 801 is fitted swingably into the second receptacle 206. A sector-gear driving boss 800 protrudes from the left surface of the sector gear 80 as shown in FIG. 4. The sector-gear driving boss 800 contacts slidably with the sector-gear groove 63.

As illustrated in FIGS. 1, 2 and 4, in front of the sector gear 80, there is disposed a damper driving gear 81. The damper driving gear 81 is made of resin, and is formed as a disk shape. The damper driving gear 81 meshes with the sector gear 80.

As illustrated in FIGS. 1 and 4, the shut-off damper 7 comprises a damper body 70, and a sealing frame 71. The shut-off damper 7 is disposed in front of the vertical fin assembly 3 inside the retainer body 20. The damper body 70 is made of resin, and is formed as a rectangular shape. A damper swing shaft 700 protrudes from the left periphery of the damper body 70. The leading end of the damper swing shaft 700 projects leftward from the left side of the retainer body 20 through the third receptacle 207 as shown in FIG. 1. The damper driving gear 81 is fastened to a leading end of the damper swing shaft 700. The sealing frame 71 is made of rubber, and is formed as a framed rectangular shape. The sealing frame 71 is fitted around the outer periphery of the damper body 70.

Figure 5:
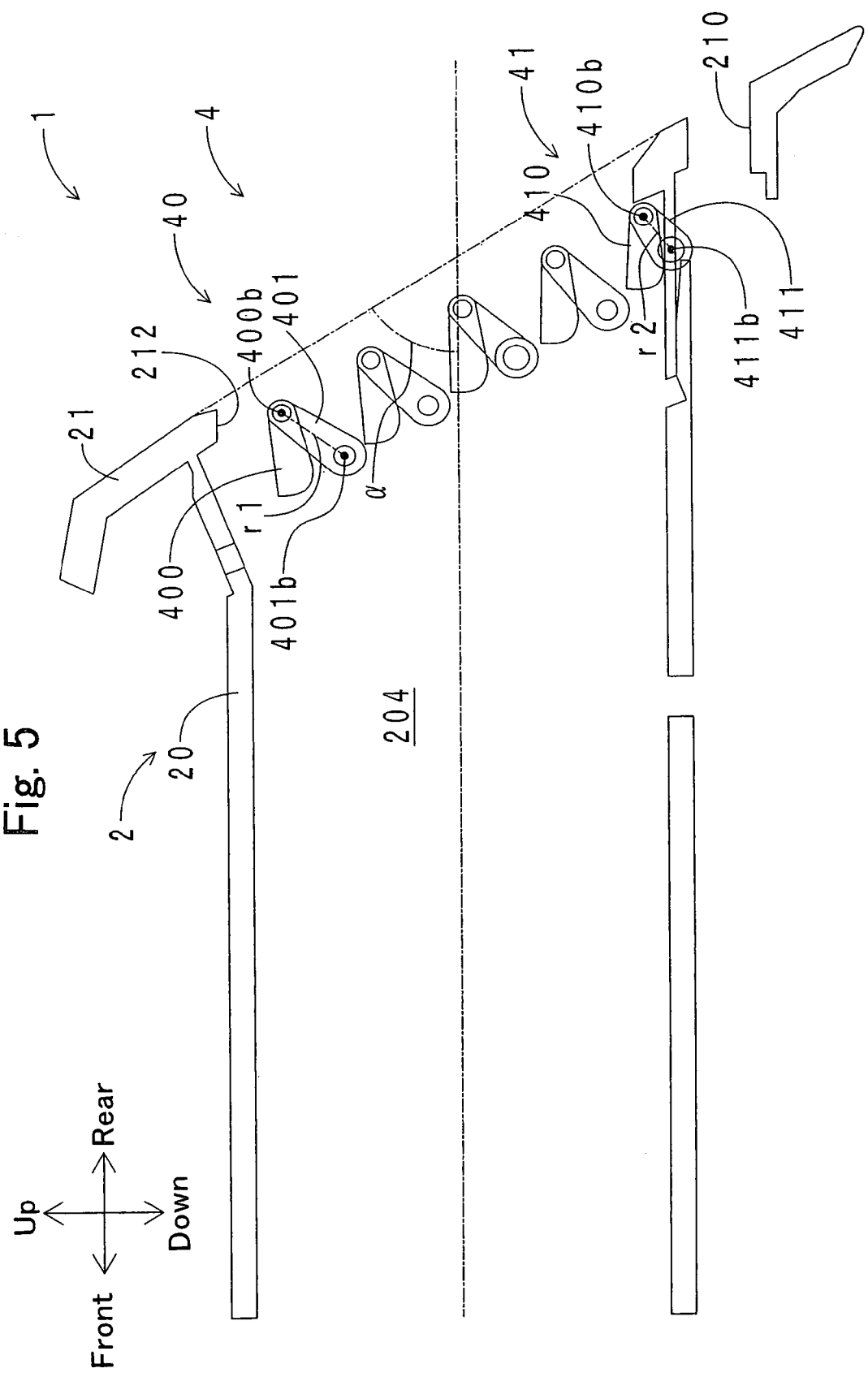
FIG. 5 is a schematic cross-sectional diagram of the air-conditioning register.

The shape of the air-conditioning register 1 according an example of the present invention will be hereinafter described. FIG. 5 illustrates a schematic cross-sectional diagram of the air-conditioning register 1. As shown in the drawing, the lengthwise direction of the ventilation passage 204 is designed to intersect with the decorative surface of the instrument panel, specifically, with the decorative surface of the bezel 21 at an intersection angle α of about 60 degrees, namely, an acute angle.

Moreover, the swinging radius $r_1$ of the main fin members 40 (or the distance between the main-fin swing shaft 400b and the main-fin connector shaft 401b) is designed to be longer than the swinging radius $r_2$ of the sub fin member 41 (or the distance between the sub-fin swing shaft 410b and the guided boss 411b).

Figure 6:
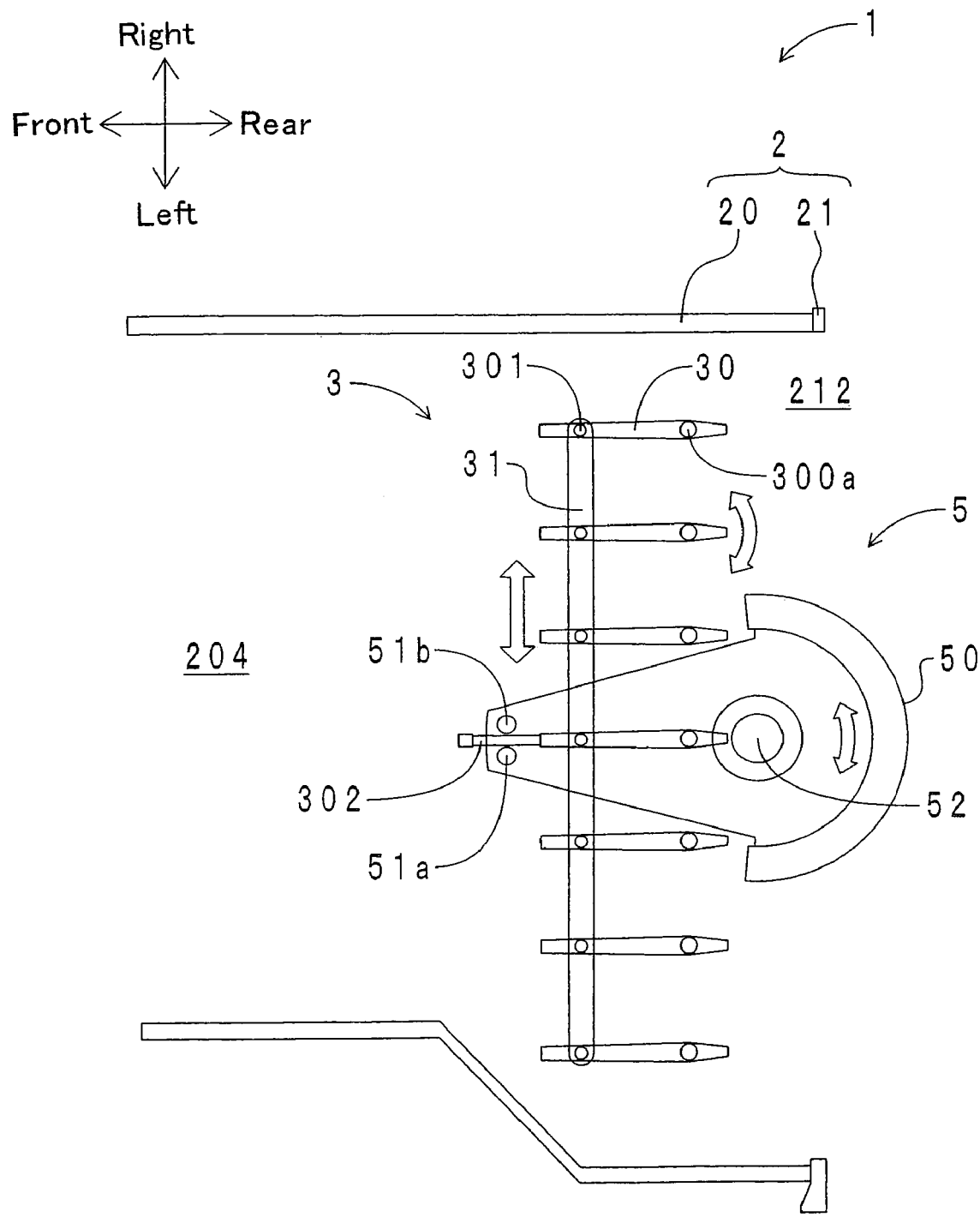
FIG. 6 is a top schematic cross-sectional diagram for illustrating the vertical fin assembly of the air-conditioning register which is placed at the datum position.
Figure 7:
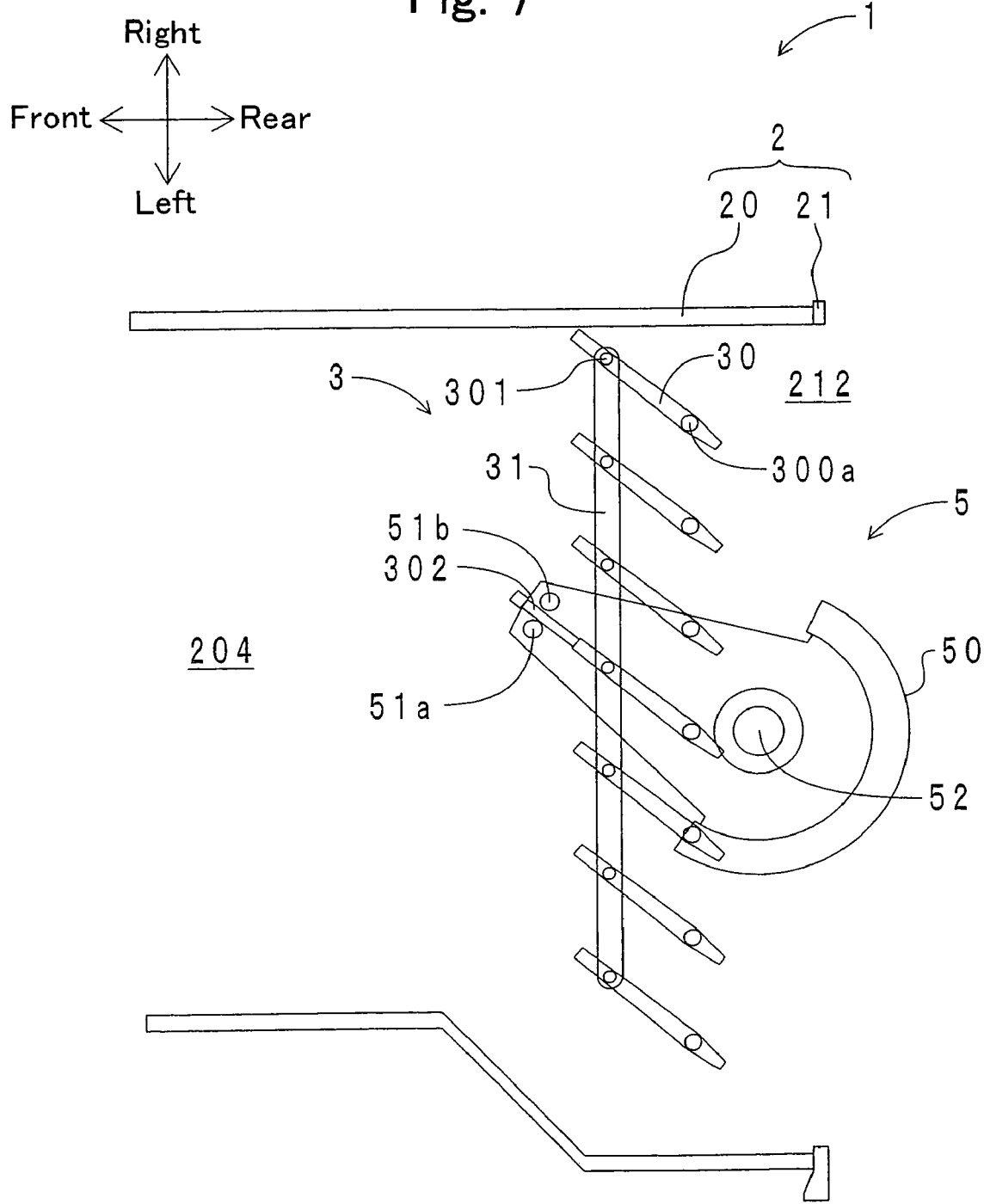
FIG. 7 is a top schematic cross-sectional diagram for illustrating the vertical fin assembly of the air-conditioning register which is swung to the left swing position.
Figure 8:
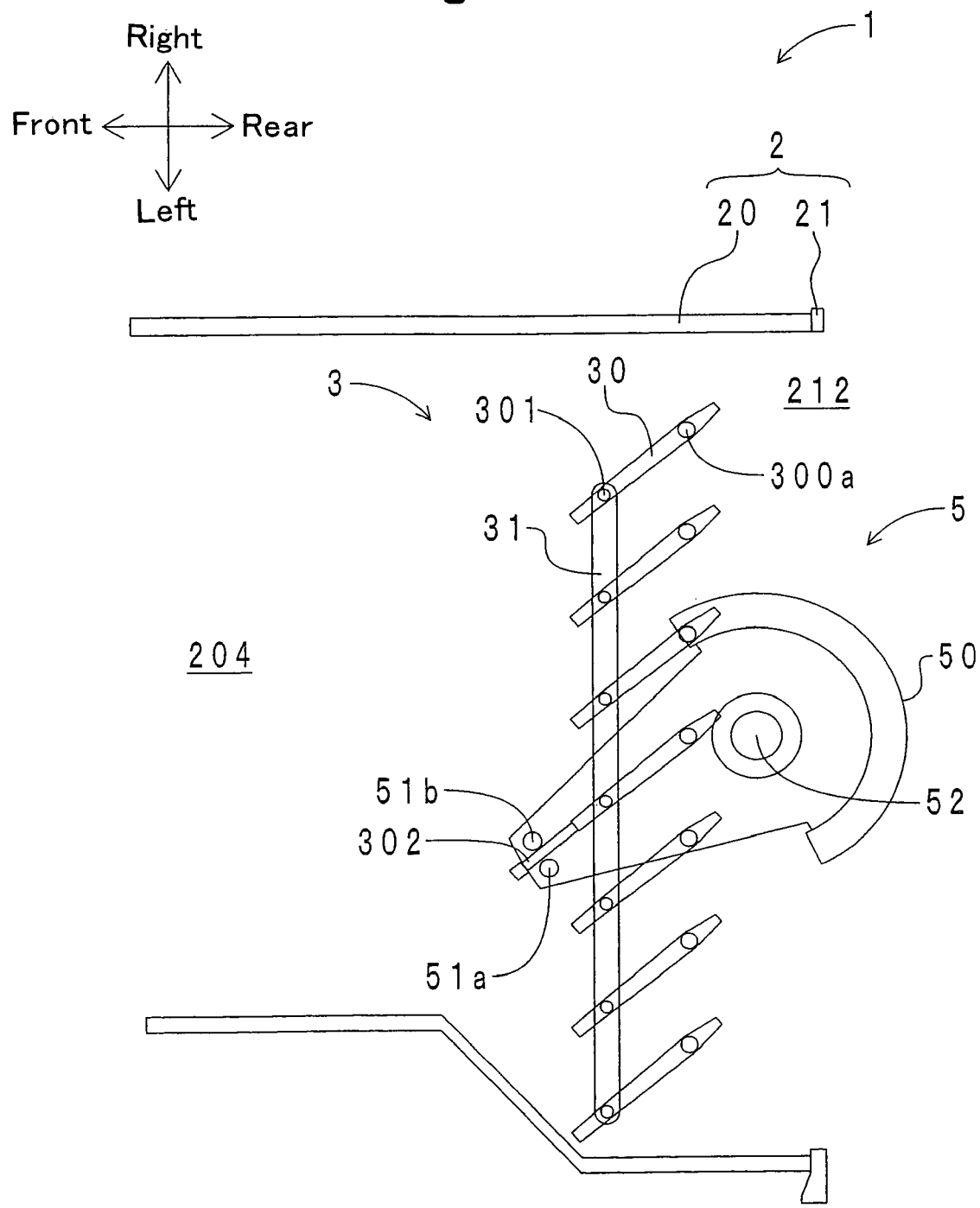
FIG. 8 is a top schematic cross-sectional diagram for illustrating the vertical fin assembly of the air-conditioning register which is swung to the right swing position.

The air-conditioning register 1 according to an example of the present invention will be hereinafter described regarding the movements of the vertical fin assembly 3 in the blowing direction adjusting mode. FIG. 6 illustrates a top schematic cross-sectional diagram in which the vertical fin assembly 3 of the air-conditioning register 1 is placed at the datum position (or substantially middle position in the right/left direction). FIG. 7 illustrates a top schematic cross-sectional diagram in which the vertical fin assembly 3 of the air-conditioning register 1 is swung to the left swing position. FIG. 8 illustrates a top schematic cross-sectional diagram in which the vertical fin assembly 3 of the air-conditioning register 1 is swung to the right swing position. Note that, in the drawings, parts which do not affect the swinging movements of the vertical fin assembly 3 are left out.

Firstly, the movements of the vertical fin assembly 3 will be described when switching the datum position shown in FIG. 6 to the left swing position shown in FIG. 7. As illustrated in FIG. 6, when an operator applies an operating force to the input element 50 of the vertical-fin-assembly operation dial 5 in the left direction, the vertical-fin-assembly operation dial 5 swings about the dial swing boss 52 in the clockwise direction in the drawing. Accordingly, the dial pins 51a, 51b move in the right direction. Note that the driving-force transmitter rod 302 interposes between the two dial pins 51a, 51b. Consequently, the driving-force transmitter rod 302 moves likewise in the right direction together with the dial pins 51a, 51b. Therefore, the vertical fin member 30 disposed at the middle in the right/left direction swings about the vertical-fin swing shaft 300a in the clockwise direction in the drawing. That is, the middle vertical fin member 30 is directed leftward. Note that the vertical-fin connecting rod 31 connects the middle vertical fin member 30 with the other six vertical fin members 30. Accordingly, the other six vertical fin members 30 swing about the vertical-fin swing shafts 300a, respectively, in the clockwise direction in the drawing. Consequently, as illustrated in FIG. 7, all of the vertical fin members 30 are directed leftward. Thus, the operator carries out the switching from the datum position to the left swing position.

Secondly, the movements of the vertical fin assembly 3 will be described when switching the datum position shown in FIG. 6 to the right swing position shown in FIG. 8. As illustrated in FIG. 6, when an operator applies an operating force to the input element 50 of the vertical-fin-assembly operation dial 5 in the right direction, the vertical-fin-assembly operation dial 5 swings about the dial swing boss 52 in the counterclockwise direction in the drawing. Accordingly, the dial pins 51a, 51b move in the left direction. Note that the driving-force transmitter rod 302 interposes between the two dial pins 51a, 51b. Consequently, the driving-force transmitter rod 302 moves likewise in the left direction together with the dial pins 51a, 51b. Therefore, the vertical fin member 30 disposed at the middle in the right/left direction swings about the vertical-fin swing shaft 300a in the counterclockwise direction in the drawing. That is, the middle vertical fin member 30 is directed rightward. Note that the vertical-fin connecting rod 31 connects the middle vertical fin member 30 with the other six vertical fin members 30. Accordingly, the other six vertical fin members 30 swing about the vertical-fin swing shafts 300a, respectively, in the counterclockwise direction in the drawing. Consequently, as illustrated in FIG. 8, all of the vertical fin members 30 are directed rightward. Thus, the operator carries out the switching from the datum position to the right swing position.

Figure 9:
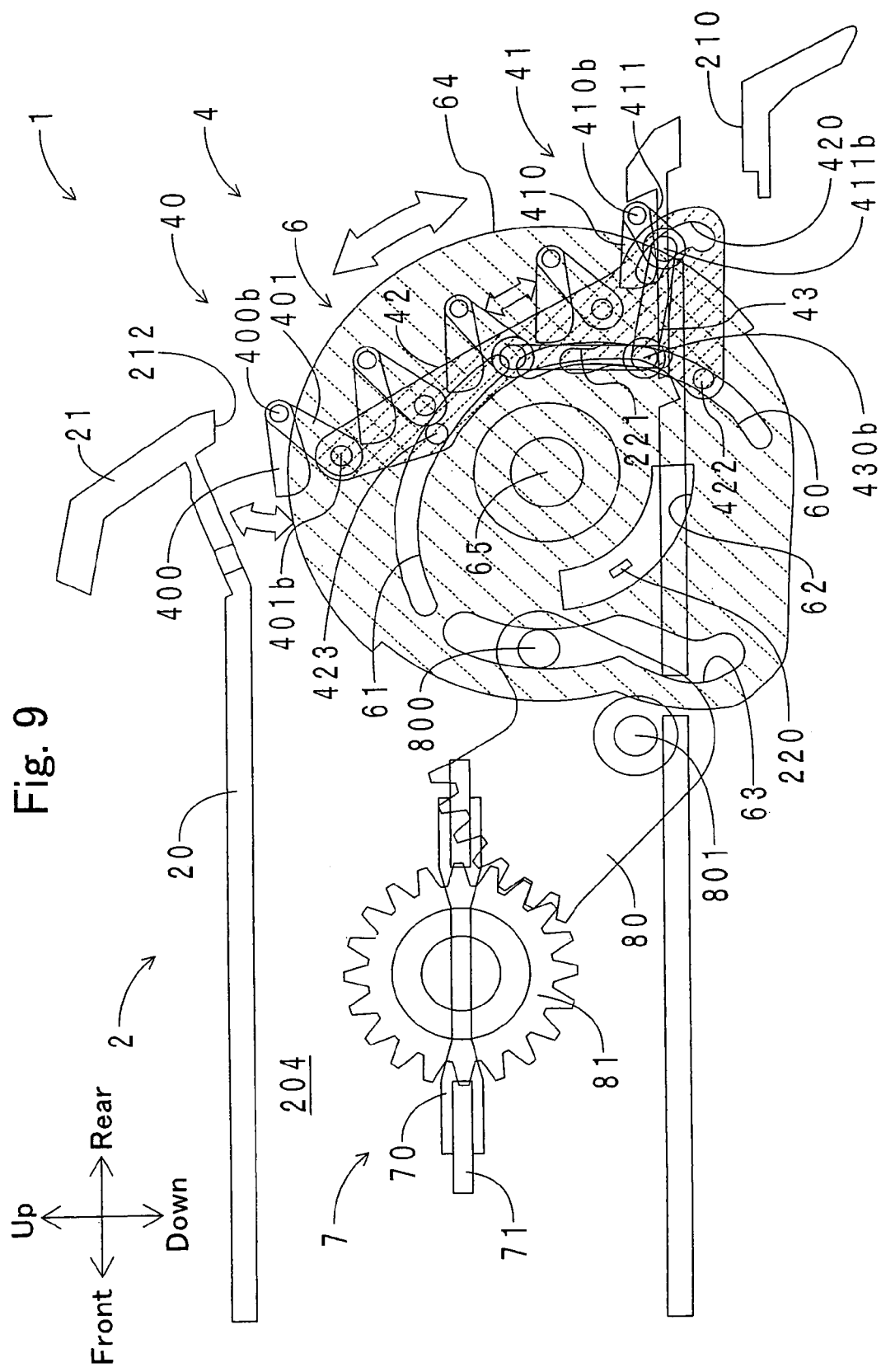
FIG. 9 is a left schematic cross-sectional diagram for illustrating the horizontal fin assembly of the air-conditioning register which is placed at the datum position.
Figure 10:
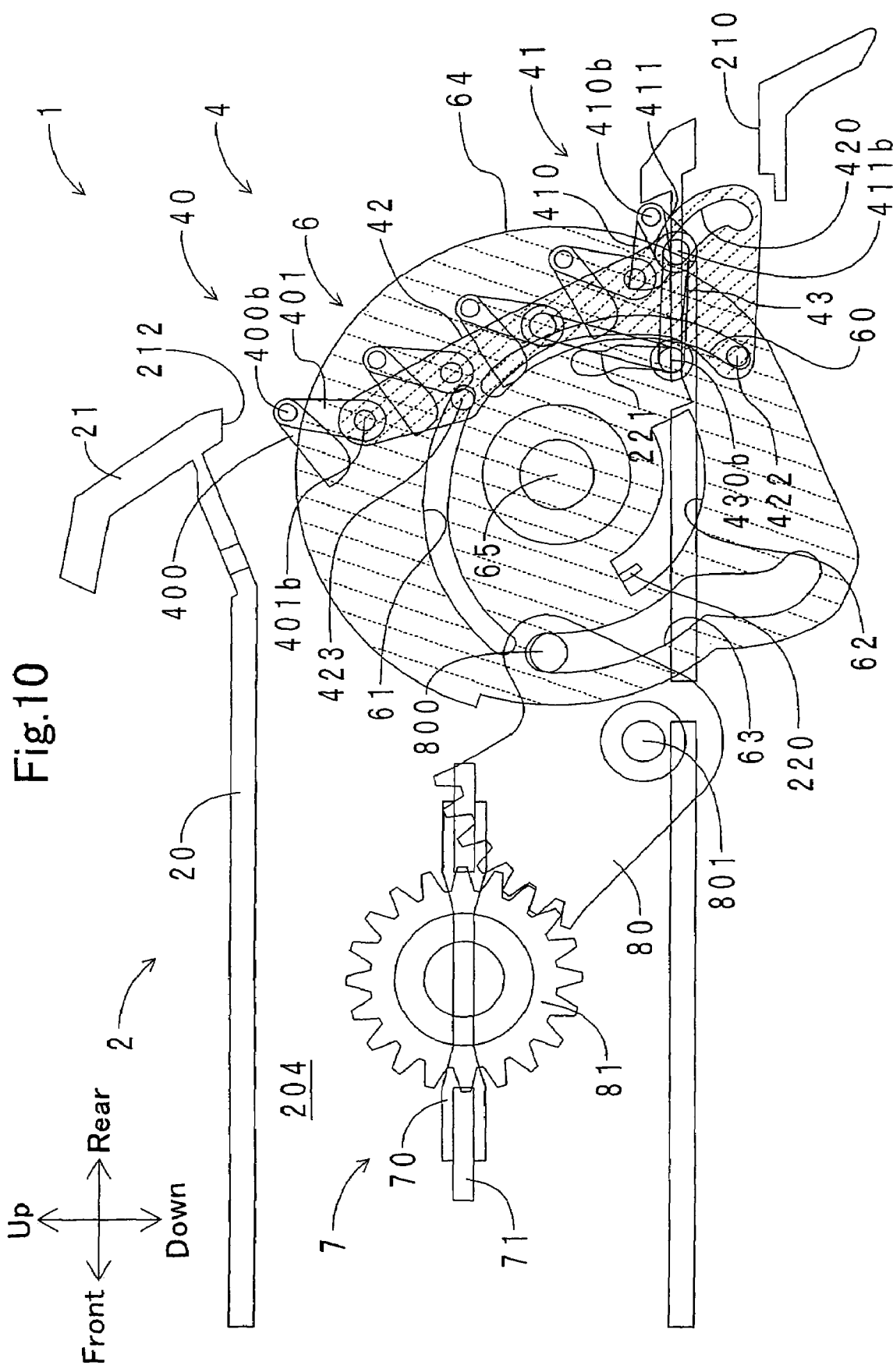
FIG. 10 is a left schematic cross-sectional diagram for illustrating the horizontal fin assembly of the air-conditioning register which is swung to the up swing position.
Figure 11:
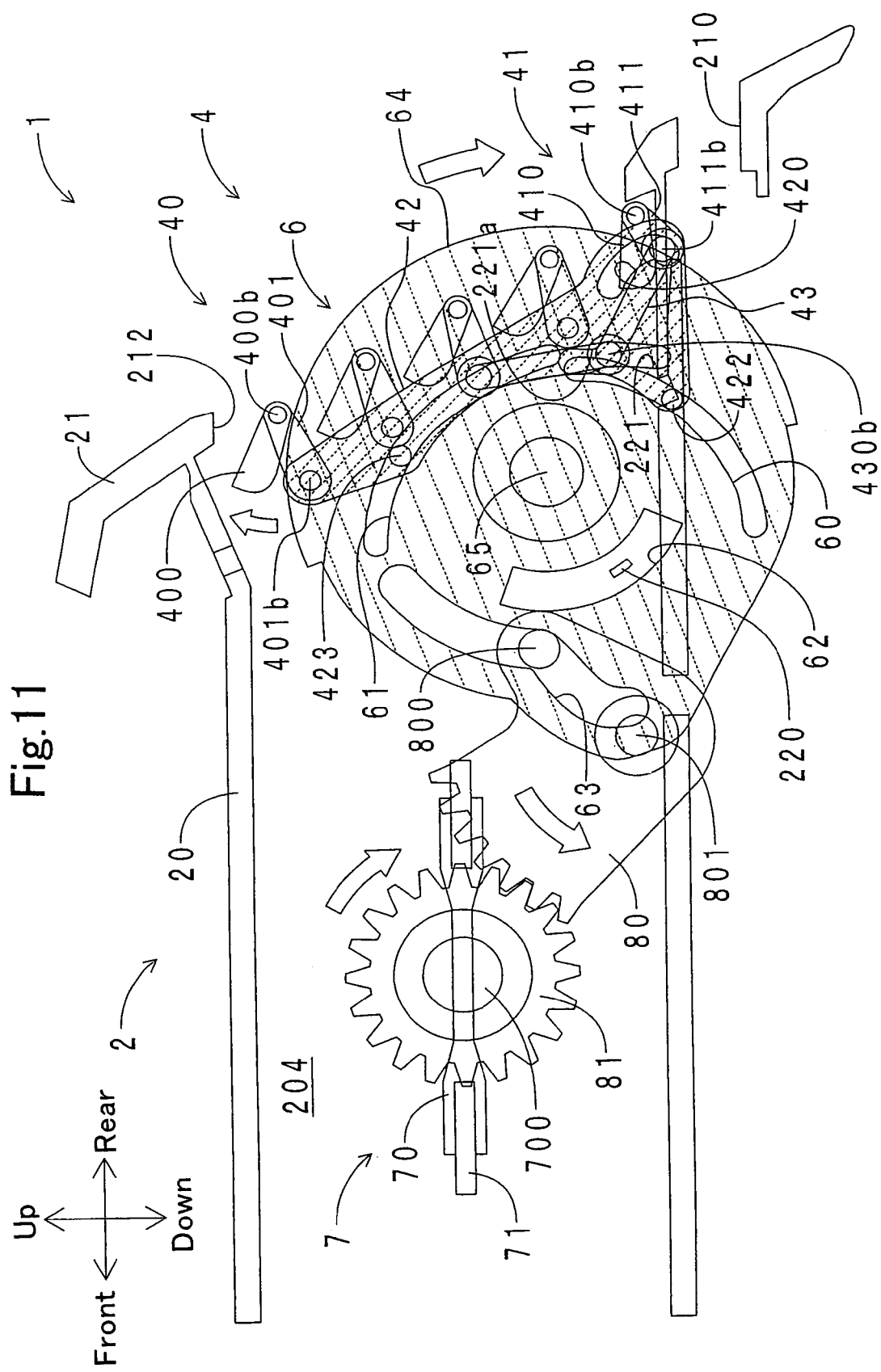
FIG. 11 is a left schematic cross-sectional diagram for illustrating the horizontal fin assembly of the air-conditioning register which is swung to the down swing position.

The air-conditioning register 1 according to an example of the present invention will be hereinafter described regarding the movements of the horizontal fin assembly 4 in the blowing direction adjusting mode. FIG. 9 illustrates a left schematic cross-sectional diagram in which the horizontal fin assembly 4 of the air-conditioning register 1 is placed at the datum position (or substantially middle position in the up/down direction). FIG. 10 illustrates a left schematic cross-sectional diagram in which the horizontal fin assembly 4 of the air-conditioning register 1 is swung to the up swing position. FIG. 11 illustrates a left schematic cross-sectional diagram in which the horizontal fin assembly 4 of the air-conditioning register 1 is swung to the down swing position. Note that, in the drawings, parts which do not affect the swinging movements of the horizontal fin assembly 4 are left out. Moreover, in view of the descriptive convenience, the horizontal-fin-assembly operation dial 6 and horizontal-fin-assembly connecting rod 42 are hatched with dotted lines.

Firstly, the movements of the horizontal fin assembly 4 will be described when switching the datum position shown in FIG. 9 to the up swing position shown in FIG. 10. As illustrated in FIG. 9, when an operator applies an operating force to the input element 64 of the horizontal-fin-assembly operation dial 6 in the upward direction, the horizontal-fin-assembly operation dial 6 swings about the dial swing boss 65 in the counterclockwise direction in the drawing. Accordingly, the connecting-rod first pin 422 slides in the first-pin groove 60 toward the clockwise opposite end in the drawing relatively to the horizontal-fin-assembly operation dial 6. Simultaneously therewith, the connecting-rod second pin 423 slides in the second-pin groove 61 toward the clockwise opposite end in the drawing relatively to the horizontal-fin-assembly operation dial 6. Note that the first-pin groove 60 and second-pin groove 61 are not formed as arc shapes concentrically with respect to the swing center of the horizontal-fin-assembly operation dial 6 (or the central axis of the dial swing boss 65). Consequently, the side groove surface of the first-pin groove 60 regulates the connecting-rod first pin 422. Likewise, the side groove surface of the second-pin groove 61 regulates the connecting-rod second pin 423. Thus, both of the first-pin groove 60 and second-pin groove 61 regulate the horizontal-fin-assembly connecting rod 42 to move rearward as well as downward. Note that the horizontal-fin-assembly connecting rod 42 supports the four main-fin connector shafts 401b pivotably. Accordingly, the main-fin connector shafts 401b also move rearward as well as downward. Consequently, as illustrated in FIG. 10, the four main fin members 40 swing in the counterclockwise direction in the drawing. That is, the four main fin members 40 are directed upward. The four main fin members 40 complete swinging when the stopper 220 contacts with the clockwise opposite groove end of the stopper groove 62 in the drawing relatively to the horizontal-fin-assembly operation dial 6. Thus, the operator carries out the switching from the datum position to the up swing position.

Note that the guided boss 411b moves in the guide groove 420 toward the upward opposite groove end relatively to the horizontal-fin-assembly connecting rod 42. In this instance, the side groove surface or groove opposite ends of the guide groove 420 do not regulate the guided boss 411b. Accordingly, no driving force transmits from the horizontal-fin-assembly connecting rod 42 to the sub fin member 41. Consequently, the sub fin member 41 is kept being directed in the substantially horizontal direction.

Moreover, the sector-gear driving boss 800 moves in the sector-gear groove 63 toward the clockwise opposite end relatively to the horizontal-fin-assembly operation dial 6. In this instance, the side groove surface or groove opposite ends of the sector-gear groove 63 do not regulate the sector-gear driving boss 800. Accordingly, no driving force transmits from the horizontal-fin-assembly operation dial 6 to the sector gear 80. Consequently, the shut-off damper 7 is kept being directed in the substantially horizontal direction.

Secondly, the movements of the horizontal fin assembly 4 will be described when switching the datum position shown in FIG. 9 to the down swing position shown in FIG. 11. As illustrated in FIG. 9, when an operator applies an operating force to the input element 64 of the horizontal-fin-assembly operation dial 6 in the downward direction, the horizontal-fin-assembly operation dial 6 swings about the dial swinging boss 65 in the clockwise direction in the drawing. Accordingly, the connecting-rod first pin 422 slides in the first-pin groove 60 toward the counterclockwise opposite end in the drawing relatively to the horizontal-fin-assembly operation dial 6. Simultaneously therewith, the connecting-rod second pin 423 slides in the second-pin groove 61 toward the counterclockwise opposite end in the drawing relatively to the horizontal-fin-assembly operation dial 6. Note that the first-pin groove 60 and second-pin groove 61 are not formed as arc shapes concentrically with respect to the swing center of the horizontal-fin-assembly operation dial 6 (or the central axis of the dial swing boss 65). Consequently, the side groove surface of the first-pin groove 60 regulates the connecting-rod first pin 422. Likewise, the side groove surface of the second-pin groove 61 regulates the connecting-rod second pin 423. Thus, both of the first-pin groove 60 and second-pin groove 61 regulate the horizontal-fin-assembly connecting rod 42 to move forward as well as upward. Note that the horizontal-fin-assembly connecting rod 42 supports the four main-fin connector shafts 401b pivotably. Accordingly, the main-fin connecting shafts 401b also move forward as well as upward. Consequently, as illustrated in FIG. 11, the four main fin members 40 swing in the clockwise direction in the drawing. That is, the four main fin members 40 are directed downward.

However, when the four main fin members 40 swing in the clockwise direction in the drawing, the first arm boss 430b moves upward in the arm/boss guide groove 221. When the first arm boss 430b arrives at a flexure 221a (See also FIG. 4) of the arm/boss guide groove 221, the operation resistance enlarges suddenly. When the operator recognizes the sudden increment of the operation resistance tactually, he or she stops applying the operating force to the input element 64 of the horizontal-fin-assembly operation dial 6 to complete swinging the four main fin members 40. Thus, the operator carries out the switching from the datum position to the down swing position.

Note that the guided boss 411b moves in the guide groove 420 toward the downward opposite groove end relatively to the horizontal-fin-assembly connecting rod 42. In this instance, the side groove surface or groove opposite ends of the guide groove 420 do not regulate the guided boss 411b. Accordingly, no driving force transmits from the horizontal-fin-assembly connecting rod 42 to the sub fin member 41. Consequently, the sub fin member 41 is kept being directed in the substantially horizontal direction.

Moreover, the sector-gear driving boss 800 moves in the sector-gear groove 63 toward the counterclockwise opposite end relatively to the horizontal-fin-assembly operation dial 6. In this instance, the side groove surface or groove opposite ends of the sector-gear groove 63 do not regulate the sector-gear driving boss 800. Accordingly, no driving force transmits from the horizontal-fin-assembly operation dial 6 to the sector gear 80. Consequently, the shut-off damper 7 is kept being directed in the substantially horizontal direction.

Figure 12:
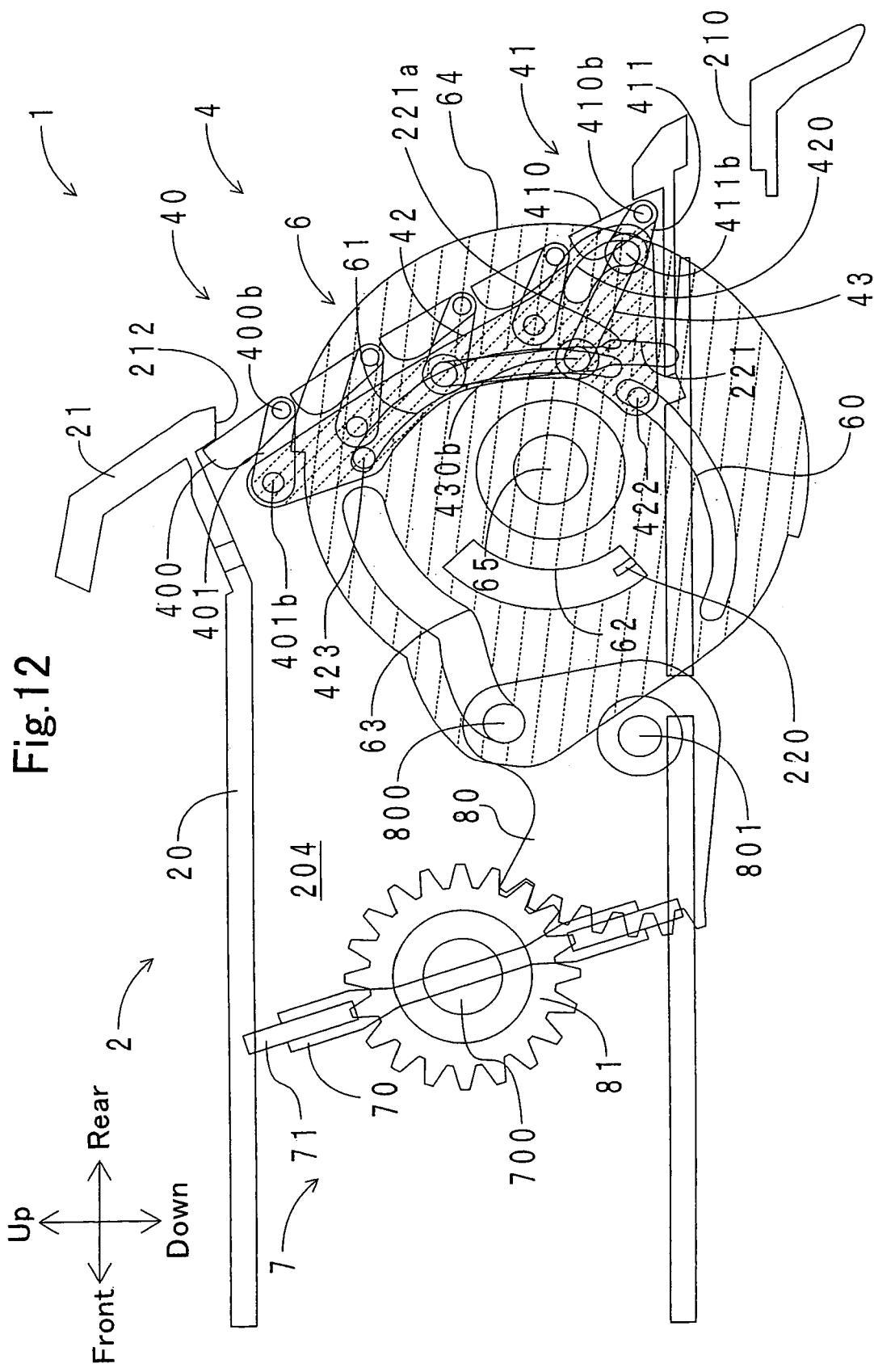
FIG. 12 is a left schematic cross-sectional diagram for illustrating the air-conditioning register in the shut-off mode.

The air-conditioning register 1 according to an example of the present invention will be hereinafter described regarding the movements of the horizontal fin assembly 4 in switching the blowing direction adjusting mode to the shut-off mode. FIG. 12 illustrates a left schematic cross-sectional diagram in which the air-conditioning register 1 is put in the shut-off mode. Note that, in the drawing, parts which do not affect the swinging movements of the horizontal fin assembly 4 are left out. Moreover, in view of the descriptive convenience, the horizontal-fin-assembly operation dial 6 and horizontal-fin-assembly connecting rod 42 are hatched with dotted lines.

When the operator applies an operating force further downward to the horizontal-fin-assembly operation dial 6 of the air-conditioning register 1 whose horizontal fin assembly 4 is swung to the down swing position, the first arm boss 430b goes over the flexure 221a (see also FIG. 4) of the arm boss guide groove 221. That is, the first arm boss 430b moves to the top of the arm boss guide groove 221. Accordingly, the operation resistance diminishes again. Consequently, the four main fin members 40 swing further in the clockwise direction in the drawing. However, note that the one of the main fin members 40, specifically, the third main fin member 40 from the top is connected with the sub fin member 41 by way of the connecting arm 43. Moreover, the groove shape of the arm/boss guide groove 221 regulates the track of the connecting arm 43. In addition, the guided boss 411b has already arrived at the clockwise opposite groove end of the guide groove 420 in the drawing. Accordingly, the connecting arm 43 pulls the sub fin member 41, and the downward opposite groove end of the guide groove 420 of the horizontal-fin-assembly connecting rod 42 presses the sub fin member 41. Consequently, the sub fin member 41 swings about the sub-fin swing shaft 410b in the clockwise direction in the drawing. Note that, as illustrated in FIG. 5, the swinging radius $r_2$ of the sub fin member 41 is designed to be shorter than the swinging radius $r_1$ of the main fin members 40. As a result, the sub fin member 41 swings at a faster speed than the swinging speed of the main fin members 40.

Moreover, when the operator applies an operating force further downward to the horizontal-fin-assembly operation dial 6 of the air-conditioning register 1 whose horizontal fin assembly 4 is swung to the down swing position, the inner-peripheral side groove surface of the sector-gear groove 63 presses the sector-gear driving boss 800 to move forward. Accordingly, the sector gear 80 swings about the gear swing boss 801 in the counterclockwise direction in the drawing. Note that the sector gear 80 meshes with the damper driving gear 81. Consequently, the damper driving gear 81 swings about the damper swing shaft 700 in the clockwise direction in the drawing. Thus, the shut-off damper 7 swings as well in the clockwise direction in the drawing.

As illustrated in FIG. 12, the sub fin member 41, main fin members 40 and shut-off damper 7 complete swinging when the stopper 220 contacts with the counterclockwise opposite groove end of the stopper groove 62 in the drawing. That is, when the stopper 220 contacts with the counterclockwise opposite groove end of the stopper groove 62 in the drawing, the air-conditioning register 1 is switched to the shut-off mode in which the horizontal fin assembly 4 closes the outlet opening 212 apparently and the shut-off damper 7 closes the ventilation passage 204 practically. Thus, the operator carries out the switching from the blowing direction adjusting mode to the shut-off mode.

Finally, the air-conditioning register 1 according to an example of the present invention will be described regarding how it effects advantages. The sub fin member 41 is disposed substantially horizontally and independently of the main fin members 40. Accordingly, the sub fin member 41 and the decorative surface of the instrument panel are less likely to be disposed at relatively close angles in proximity to each other. Consequently, wake flows are less likely to occur. Thus, the air-conditioning register 1 exhibits a high air-conditioning air directivity because it inhibits wake flows from occurring.

Moreover, the swinging radius $r_2$ of the sub fin member 41 is designed to be shorter than the swinging radius $r_1$ of the main fin members 40. Accordingly, the sub fin member 41 swings at a faster speed than the swinging speed of the main fin members 40. Consequently, when switching the blowing direction adjusting mode to the shut-off mode, all of the fin members constituting the horizontal fin assembly 4 (i.e., the four main fin members 40 and the one sub fin member 41) close the outlet opening 212 substantially simultaneously. As a result, the air-conditioning register 1 gives a good appearance.

In addition, in the air-conditioning register 1, the guided boss 411b only slides in the guide groove 420 relatively to the horizontal-fin-assembly connecting rod 42 in the blowing direction adjusting mode. Accordingly, no driving force transmits from the horizontal-fin-assembly connecting rod 42 to the sub fin member 41. Consequently, the sub fin member 41 does not swing in the flowing direction adjusting mode.

On the contrary, when switching the blowing direction adjusting mode to the shut-off mode, the guided boss 411b contacts with the downward opposite groove end of the guide groove 420 of the horizontal-fin-assembly connecting rod 42, specifically, the end disposed beyond the movable range of the guided boss 41 in the blowing direction adjusting mode. Accordingly, a driving force transmits from the horizontal-fin-assembly connecting rod 42 to the sub fin member 41 by way of the contact between the guided boss 411b and the guide groove 420. Consequently, the sub fin member 41 swings. Thus, the air-conditioning register 1 enables the operator to control the swing of the sub fin member 41 with ease comparatively by sliding the guided boss 411b in the guide groove 420 relatively to the horizontal-fin-assembly connecting rod 42 and contacting the guided boss 411b with the downward opposite groove end of the guide groove 420.

Modified Versions

Heretofore, a few of the embodiment modes of the present air-conditioning register are described. However, the embodiment modes are not limited to the above-described embodiment modes particularly. It is possible to perform the present air-conditioning register in various modified embodiment modes or improved embodiment modes which one of ordinary skill in the art can carry out.

For example, in the air-conditioning register 1 according to an example of the present invention, the main fin members 40 comprise two component parts, the main fin body 400 and the main-fin fastening tab 401, respectively. However, the main fin members 40 can comprise a one-piece component part, respectively. Likewise, the sub fin member 41 can comprise a one-piece component part. Further, the number of the main fin members 40 is not limited in particular. Furthermore, the present air-conditioning register can be applied not only to air conditioners for vehicles but also to air conditioners for aircraft, ships or vessels, and houses. Moreover, the present air-conditioning register can be applied not only to decorative panels slanting in the up/down direction but also to decorative panels slanting in the right/left direction. In this instance, the vertical fin assembly can naturally comprise a plurality of main fin members, and a sub fin member. In addition, it is possible to reverse the respective dispositions of the stopper 220 and stopper groove 62, the connecting-rod second pin 423 and second-pin groove 61, the connecting-rod first pin 422 and first-pin groove 60, the sector-gear driving boss 800 and sector-gear groove 63, and the guided boss 411b and guide groove 420 in the above-described air-conditioning register 1. Still further, the shut-off damper 7 cannot necessarily be disposed in the present air-conditioning apparatus. That is, it is advisable to apparently and practically shut off the outlet opening 212 with the horizontal fin assembly 4 alone.

Having now fully described the present invention, it will be apparent to one of ordinary skill in the art that many changes and modifications can be made thereto without departing from the spirit or scope of the present invention as set forth herein including the appended claims.

What is claimed is:

1. A register for air conditioning, the register being buried in a decorative panel having a decorative surface, and comprising:
   a cylinder-shaped retainer having a ventilation passage through which air-conditioning air flows, and an outlet opening communicating with the ventilation passage, the air-conditioning air flowing out the outlet opening into a room, the ventilation passage of the retainer extending in a lengthwise direction that intersects with the decorative surface of the decorative panel at an acute angle;
   a fin assembly disposed swingably and adjacent to the outlet opening in the retainer; the fin assembly comprising a plurality of main fin members disposed in a manner neighboring one after another, and a sub fin member disposed before a first one of the main fin members or after a last one of the main fin members;
   a connecting member comprising main connectors respectively connected to the main fin members, and a sub connector connected to the sub fin member; and
   an operating member driving the connecting member and switching the register interchangeably between a blowing direction adjusting mode, in which the fin assembly adjusts a blowing direction of the air-conditioning air; and a shut-off mode, in which the fin assembly shuts off the outlet opening;
   the register further comprising:
   an arm boss guide groove including a long groove formed in the retainer; and
   a connecting arm comprising a main fin-side rod pivotably supported by one of the main fin members, and a sub fin-side rod pivotably supported by the sub fin member;
   the connecting arm having a pivotably supporting axis by which the main fin-side rod and the sub fin-side rod are pivotably supported with each other;
   the pivotably supporting axis of the connecting arm being pivotably supported by the arm boss guide groove and sliding therein;
   the main fin members respectively comprising a main-side center defining a swing center of swinging motion, and a main-side connector connected with one of the main connectors;
   the sub fin member comprising a sub-side center defining a swing center of swinging motion, and a sub-side connector connected with the sub connector;
   one of the sub connector and the sub-side connector comprising a guide groove formed by a long groove;
   another one of the sub connector and the sub-side connector comprising a guided boss sliding in the guide groove relative to the one of the sub connector and the sub-side connector;
   the guided boss only sliding in the guide groove in the blowing direction adjusting mode, and inhibiting a driving force from transmitting between the connecting member and the sub fin member;
   the guided boss contacting with an end of the guide groove when switching the blowing direction adjusting mode to the shut-off mode; and when switching to the shut-off mode, the guide boss transmitting a driving force from the connecting member to the sub fin member via a contact between the guided boss and the guide groove;
   a relative position of the main-side connector and the sub-side connector being regulated by the connecting member and the connecting arm; and
   the main fin members swinging and the sub fin member being held substantially parallel to the lengthwise direction of the ventilation passage in the blowing direction adjusting mode.

2. The register set forth in claim 1, wherein:
   the pivotably supporting axis of the connecting arm is disposed in one area of the arm boss guide groove when in the blowing direction adjusting mode, the pivotably supporting axis of the connecting arm is disposed in another area of the arm boss guide groove when in the shut-off mode, and the pivotably supporting axis of the connecting arm moves between the one area and the another area when switching between the blowing direction adjusting mode and the shut-off mode;
   when switching from the blowing direction adjusting mode to the shut-off mode;
   the connecting member moves outside of a movable range of the connecting member in the blowing direction adjusting mode in accordance with movement of the pivotably supporting axis of the connecting arm;

the sub fin member swings in accordance with the movement of the connecting member; and the main fin members are swung beyond their swingable angular range in the blowing direction adjusting mode in accordance with the movement of the connecting member.

3. The register set forth in claim 1, wherein the sub fin member swings at a swinging speed faster than that of the main fin members.

4. The register set forth in claim 2, wherein:

when switching from the blowing direction adjusting mode to the shut-off mode;

the main fin members and the sub fin member stop swinging substantially simultaneously.

5. The register set forth in claim 1, wherein a first distance between the sub-side center and the sub-side connector is shorter than a second distance between the main-side center and the main-side connector.

6. The register set forth in claim 1, wherein:

the ventilation passage extends in a substantially horizontal direction;

the decorative panel comprises an instrument panel having a decorative surface which inclines so as to bulge into the room from small to large from upward to downward;

the fin assembly comprises a horizontal fin assembly; and the sub fin member is disposed lowermost in the horizontal fin assembly.

* * * * *